United States Patent
Schmelzer et al.

[11] Patent Number: 6,139,665
[45] Date of Patent: Oct. 31, 2000

[54] METHOD FOR FABRICATING HEAT INSULATING PAPER CUPS

[75] Inventors: Michael A. Schmelzer, Appleton, Wis.; Diana L. Penn, St. Louis; Mikel A. Ingram, Ellisville, both of Mo.

[73] Assignee: Fort James Corporation, Richmond, Va.

[21] Appl. No.: 09/035,759

[22] Filed: Mar. 6, 1998

[51] Int. Cl.[7] .......................... B32B 31/12; B32B 31/26; B65D 81/38
[52] U.S. Cl. .............................. 156/78; 156/79; 156/277; 229/403; 493/84; 493/96; 493/110
[58] Field of Search .................. 156/78, 79, 277; 229/400, 403; 493/84, 93, 95, 96, 99, 110; 206/524.3, 524.6; 264/45.6; 428/35.7, 195, 913

[56] References Cited

U.S. PATENT DOCUMENTS

| | | |
|---|---|---|
| 3,141,595 | 7/1964 | Edwards . |
| 3,262,625 | 7/1966 | Russell et al. . |
| 3,299,914 | 1/1967 | Harmon . |
| 3,329,306 | 7/1967 | Stein . |
| 3,374,922 | 3/1968 | Shelby . |
| 3,471,075 | 10/1969 | Wolf . |
| 4,435,344 | 3/1984 | Iioka . |
| 5,486,549 | 1/1996 | Itagaki et al. . |
| 5,490,631 | 2/1996 | Iioka et al. . |
| 5,567,747 | 10/1996 | Cappuccio et al. . |
| 5,725,916 | 3/1998 | Ishii et al. . |
| 5,766,709 | 6/1998 | Geddes et al. . |
| 5,840,139 | 11/1998 | Geddes et al. . |

Primary Examiner—Curtis Mayes
Attorney, Agent, or Firm—Burns, Doane, Swecker & Mathis, LLP

[57] ABSTRACT

A heat insulating paper cup with improved insulation in areas where printed matter exists. The printed matter is applied using a water-based alkyd or epoxy ink. In one embodiment the cup can include a body member having an inside surface and an outside surface, and a bottom panel member having a upper surface and a bottom surface. The body member is coated on its outside surface with a foamed synthetic resin, and on its inside surface with an unfoamed synthetic resin. The bottom panel member is optionally coated on its upper surface with a foamed or an unfoamed synthetic resin. The body member and bottom panel member are oriented and joined to form a seal at an interface between a portion of inside surface of the body member and a portion of the upper surface of the bottom panel member. The printed matter is applied prior to foaming of the synthetic resin on the outer surface of the cup.

15 Claims, 1 Drawing Sheet

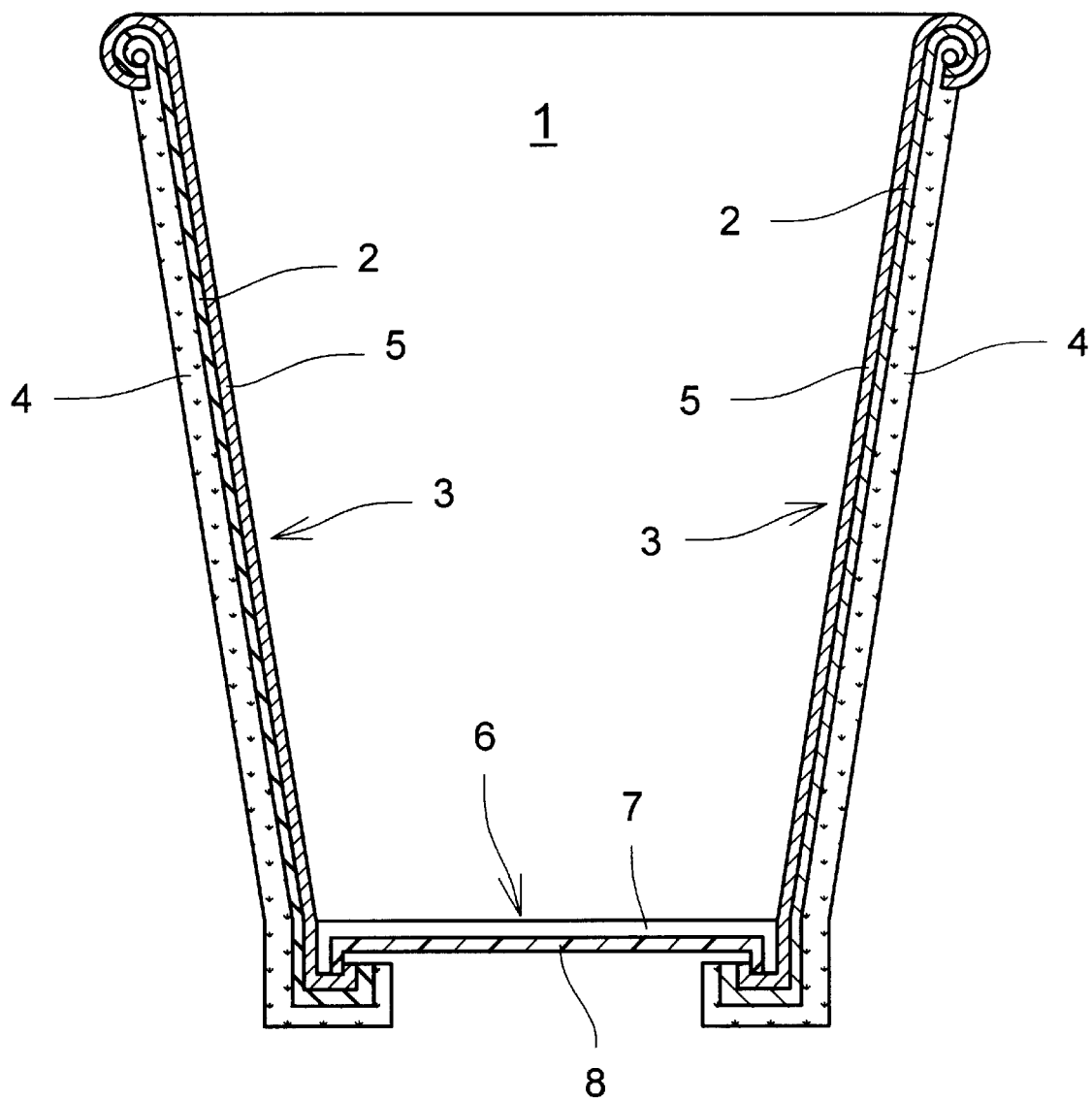

METHOD FOR FABRICATING HEAT INSULATING PAPER CUPS

BACKGROUND OF THE INVENTION

This invention relates to heat-insulating paper containers, and more particularly to heat-insulating paper cups used for coffee and other hot or cold beverages.

Several types of heat-insulating cups have been used commercially for hot and cold liquids. Examples include the wide variety of existing polystyrene foam cups. These cups are typically made by adding a foaming agent to a polystyrene resin, casting the mixture into a mold, heating the resin under pressure to foam it, and removing the shaped article from the mold. Such cups have outstanding heat-insulating properties, but require a lot of energy to make, and are costly to dispose in an environmentally acceptable way.

A variety of paper-based cups have been proposed as environmentally acceptable alternatives to polystyrene containers. Unfortunately, most attempts to produce paper-based heat-insulating cups have proved costly due to the complexity of their manufacturing processes. One example is a cup where the side wall is surrounded by a corrugated heat-insulating jacket. Its process for manufacture involves additional steps of forming the corrugated paper jacket and bonding it to the outer surface of the side wall of the cup. These cups, however, have proved to be aesthetically unappealing and structurally deficient. In this regard, only the ridges of the corrugated jacket contact the body of the paper cup in such a way that the bond between the two is so weak that the cup and jacket easily separate. Also such cups are not easily nested, making storage difficult.

Another type of insulating paper cup is one in which the cup has a dual cup structure. An inner cup is given a different taper than an outer cup to form a heat-insulting air layer in between the two cups. The two cups are integrated by curling their respective upper edges into a brim. The dual structure adds to manufacturing costs, and the two cups of the structure are prone to separation.

One of the most widely accepted types of heat-insulating paper-based cups include those described in U.S. Pat. No. 4,435,344, and also referred to in U.S. Pat. No. 5,490,63 1. Those cups have good insulting properties and can be prepared at a relatively low cost. Such cups are fabricated from a body member and a bottom member, both cut from a paper sheet.

For the cups described in the aforementioned U.S. patents, one surface of the body member is coated or laminated with a thermoplastic synthetic resin film, and the other surface of the body member is coated or laminated with the same or different thermoplastic synthetic resin film or an aluminum foil, to thereby foam the thermoplastic synthetic resin film and form a heat-insulting layer on at least one surface of the container, i.e., the outer surface. Water present in the paper is vaporized upon heating during processing, causing the thermoplastic resin film on the outer surface to foam.

Commercial versions of cups prepared according to U.S. Pat. No. 4,435,344 include a body member and a bottom panel member. The body member comprises a paper sheet coated or laminated on one side with a foamed heat-insulating layer of low density polyethylene which entirely covers its outer surface. The inner surface of the body member is covered by with an unfoamed film of high density polyethylene. The bottom panel member is laminated on its inner or upper surface with low density polyethylene film. The inside surface of the body member, and the inside surface of the bottom member are coated to prevent penetration of liquid contents into the paper sheet during use. The inside surface of the body member is also coated to ensure that the water in the paper will not evaporate directly into the air atmosphere during heating of the fabricated cup.

For these commercial cups, the film to be laminated on the inner surface of the body member is high density polyethylene because it has a higher softening point than the low density polyethylene film on the outer surface. Upon heating during fabrication, the moisture inherently present in paper sheet serves as the foaming agent for the outer surface layer of low density polyethylene film. The high density polyethylene on the inside surface of the body member will not foam under fabrication conditions but serves to seal the interior of the cup thus preventing an escape of the moisture necessary to foam the low density polyethylene on the outer surface of the cup.

An improvement over the technique of U.S. Pat. No. 4,435,344 is described in copending U.S. application Ser. No. 08/870,486, filed Jun. 6, 1997, the contents of which is incorporated here in by reference. U.S. application Ser. No. 08/870,486 describes, among other improvements, an improved seal bet ween the body member and bottom member.

Commercial cups are usually printed with a variety of logos, designs, and other printed matter. In this regard, for flexographic and rotogravure printing on polymer substrates, water-based binder resins formed from acrylic acid and its derivatives have been used in the inks of choice. When they are applied to the substrate, and dried, they rapidly form tough, durable resin films which are highly desirable, particularly with respect to beverage containers where the printed matter requires high levels of physical and chemical abuse resistance.

The inventors have found a problem with paper-based cups like those prepared according to U.S. Pat. No. 4,435,344. That problem relates to the application of printed text such as logos, etc., to their surfaces. Commercially available modified acrylic water-based inks printed on the resin surface inhibit insulation formation, with the amount of inhibition dependent on ink layer thickness. This characteristic can be beneficial in the case where an embossed effect is desired. See co-pending U.S. application Ser. No. 08/604, 783, filed Feb. 23, 1996, now U.S. Pat. No. 5,766,709 the contents of which is hereby incorporated by reference. However, that same characteristic can also be detrimental when maximum insulation is needed in the same area as the printed matter. For example, it is frequently desirable with hot beverage cups to position a printed logo in the very same area where protective insulation is needed the most, i.e., that place where the cup is held by the user's hand. While full print coverage. i.e., 100% coverage, often will not lower the insulative effect below acceptable levels (e.g., that level of a conventional double cup), the inhibition of insulation formation does impose undesirable limitations such as the exclusion of overprints (double layers of ink).

It was, therefore, an object of the invention to provide a cup like that prepared according to the techniques of U.S. Pat. No. 4,435,344, and U.S. application Ser. No. 08/870, 486, which did not exhibit the aforementioned undesirable limitations on insulation formation associated with cups printed using typical acrylic-based inks.

SUMMARY OF THE INVENTION

Accordingly, the invention is directed to a heat insulating paper cup having improved insulation in printed areas on a foamed outer surface of the cup. This is accomplished through the application of an appropriately selected water-based alkyd or epoxy ink, or a water-based ink which contains a blend or mixture of alkyd and epoxy resins. The inks used according to the invention form flexible resin films which permit insulation formation (prior to crosslinking) more readily than conventional modified acrylic inks. The inks containing alkyd and/or epoxy resins are later crosslinked and derive their necessary durability for use with beverage containers by delayed, thermally induced crosslinking, during the foaming step of manufacture.

In an additional embodiment, the cup includes a body member having an inside surface and an outside surface, and a bottom panel member having an upper surface and a bottom surface. The body member is coated (or in some instances partially coated) on its outside surface with a foamed synthetic resin, and on its inside surface with an unfoamed synthetic resin. The bottom panel member may be optionally coated on its upper surface with an unfoamed synthetic resin. The body member and bottom panel member are oriented and joined to form a heat seal at an interface between a portion of the inside surface of the body member and a portion of the upper surface of the bottom panel member.

Another embodiment relates to a method for fabricating a heat insulating paper container from a paper-based body member with an inside surface and an outside surface, and a paper-based bottom panel member with an upper surface and a bottom surface. The method comprises applying to the inside surface of the body member an inside surface laminate of a synthetic resin effective to prevent penetration of liquid into the paper during use, and applying to said outside surface an outside surface laminate of foamable synthetic resin; thereafter printing at least a portion of the outside surface of said body member having applied thereto an outside surface laminate, with a water-based alkyd or epoxy ink (or ink containing an alkyd/epoxy blend); and fabricating the container so that said body member is bonded to the bottom panel member, and the outside surface laminate of synthetic resin is foamed. The body member can be bonded to the bottom panel member before or after foaming of the outside surface laminate of synthetic resin. According to this embodiment, no substantial crosslinking, i.e., that crosslinking necessary to provide suitable ink durability, occurs until the printed outside surface laminate is foamed.

Improved foaming in printed areas is a relative characteristic, and for purposes of this invention it is intended to be relative to foaming that occurs in the unprinted areas of the cup. The present invention can provide a printed foam caliper averaging at least about 85%, preferably at least about 90%, and even more preferably about 95% or higher, of unprinted area foam caliper for a single layer of ink (100% coverage). That can be accomplished even in the complete absence of additives considered in the art to be insulation enhancers such as paraffin wax, mineral oil, emulsified wax, etc. A particularly advantageous aspect of the invention is that multiple layers of printed matter (>100%) may be used without reducing foaming to unacceptable levels (e.g., printed foam caliper averaging less than about 80% of unprinted area foam caliper for a double layer of ink).

BRIEF DESCRIPTION OF THE DRAWING

The FIGURE is a simplified cross-section of an example of a heat-insulating paper cup.

DETAILED DESCRIPTION OF THE PREFERRED EMBODIMENTS

The invention can provide a heat-insulating paper cup fabricated from a body member of paper having an inside surface laminate of a synthetic resin effective to prevent penetration of liquid into the paper during use, and an outside surface laminate of heat insulating foamed synthetic resin, where the body member is bonded to a bottom panel member having an upper surface and a bottom surface, and wherein the joined portions of the bottom panel member and body member form a seal.

As noted above, the printed matter is applied to the surface of the cup using an appropriately selected water-based alkyd or epoxy ink. Water-based inks are those inks in which water is the primary solvent. Alkyd inks and epoxy inks are those inks in which the primary binder resin is an alkyd or epoxy (or mixture/blend). The binder resin is the resin that binds the pigment(s). Such inks for use in the invention include water-based alkyd inks and water-based epoxy inks, as well as inks which are formulated using a blend or mixture of alkyd and epoxy resins. Inks used according to the invention must, of course, also provide the desired foam height characteristics in printed areas. Excluded are acrylic-based inks, as well as inks in which the primary binder is a blend or mixture of an acrylic with an alkyd and/or epoxy resin which do not provide the desired foam height characteristics in printed areas.

Water-based alkyd inks are derived from alkyd resins. These include, for example, fatty acid alkyd resins and chain stopped alkyd resins. As a general proposition, an alkyd resin is a type of polyester which can be produced by condensation polymerization of a polybasic acid, a polyol, and an oil fatty acid. The oil fatty acid can be produced by transesterification of a polyol and drying oil. Since the drying oil itself is a branched chain polyunsaturated ester, the alkyd contains the same branched chain polyunsaturated structure. The branched chains initially give the alkyd resin film an amorphous, flexible character, while the polyunsaturation enables delayed curing through aerial oxidation followed by free radical crosslinking, initiated by decomposition of the intermediate organic peroxide. The decomposition of the peroxide for initiating crosslinking can be triggered by heat and/or catalysis using crosslinkers such as cobalt or manganese. Once crosslinked, the alkyd resin film exhibits desirable toughness and durability. According to the invention, decomposition of the intermediate organic peroxide is delayed until sufficient heat is introduced during the foaming operation.

The main difference between a chain stopped alkyd resin and a fatty acid alkyd resin is that during the formation of the chain stopped alkyd resin, benzoic acid is added to stop chain growth. This will lead to properties somewhat different than those obtained with a fatty acid alkyd resin. A chain stopped alkyd resin will have a more laquer-like dry; it has an increased $T_g$, a more narrow molecular weight distribution, and will tend to be less flexible, relative to a similar alkyd resin that has not been reacted with the benzoic acid.

Suitable inks can be formulated using commercially available alkyd resins such as Duramacur 74-7472, available from McWhorter, 41-1390 available from Akzo Nobel, Beckosol 12-021 available from Reichhold, and Alkyd 5577 available from Cargill.

Water-based epoxy inks are derived from epoxy resins. Epoxy esters are preferred. Epoxy resins can be produced by polymerization of an epoxide (e.g., epichlorohydrin) and a dihydroxy compound (e.g., bisphenol A). Epoxy resins suitable for use in this invention can be further modified by condensation polymerization with an oil fatty acid to achieve structural characteristics analogous to those of the aforementioned alkyd resins (branched chain and polyunsaturated). The resultant film flexibility and crosslinking functionality is similar to that of alkyd films.

Suitable inks can also be formulated using commercially available epoxy resins such as Epotuff 92-737 available from Reichhold, 48-6002 available from Akzo Nobel, Epon DPS-155 available from Shell Oil, and 73-7331 available from McWhorter. Suitable water-based epoxy inks preferably do not contain any crosslinker. If a crosslinker is present, it is in a reduced or limited amount such that it does not prevent achieving desired foaming levels. These inks may, of course, be modified or reformulated further to meet specific needs.

An example of a suitable ink is HydroScuff PTT available from Progressive Ink.

Inks used according to the invention may also contain one or more conventional additives. Such additives include, e.g., plasticizers, wetting agents, silicone, defoamer/antifoam agents, antioxidants, antifungal/antimicrobial agents, dispersing agents, rheological control additives, and COF (coefficient of friction) control additives.

While not wishing to be bound by theory, we believe that with both alkyd and epoxy resins used according to the invention (as well as inks which are formulated using a blend or mixture of alkyd and epoxy resins), it is their flexible character which permits foam bubble formation with little or no interference. Ink durability is then effected by thermally induced crosslinking during the insulation formation step of the fabrication process. Thus, catalysts (or chemical crosslinkers) normally used with alkyd or epoxy resins to facilitate bond formation between polymer chains can be, and in most cases should be omitted, or the amount present should be reduced substantially. This facilitates a delay in crosslinking until the printed outside surface laminate is foamed, at which time the ink is exposed to heat and thermally crosslinked. Accordingly, crosslinking is effected thermally at a later stage in the process by the same heat used to generate the foam, rather than earlier using catalytic or chemical means.

The alkyd and epoxy inks used according to the invention can be applied to the synthetic resin-laminated surface using standard printing techniques. Preferred are rotogravure or flexographic printing.

The FIGURE is a simplified cross-section of an example of a heat-insulating paper cup. The invention can provide a cup of that structure. The cup generally indicated by 1 includes a body member 3 and a bottom panel member 6. The body member 3 comprises a paper sheet 2 laminated on one side with a heat-insulating layer 4 of foamed synthetic resin which entirely covers its outer surface. The inner surface of the body member is covered with an unfoamed film 5 of synthetic resin. This inner lining 5 of body member 3 provides a seal to prevent the penetration of liquid contents into the paper during use, and, also, ensures that the water in the paper will not evaporate directly into the air atmosphere when the cup is heated during the foaming operation. If the inside of body member 3 has not been sealed by an inner laminate, water will evaporate through the inside of the cup upon heating, resulting in a foaming failure of the outer surface synthetic resin film. It is the moisture inherently present in paper sheet 2 which serves as the foaming agent for the outer surface layer of synthetic resin film.

The inner or upper surface of the bottom panel member 6 preferably will be also laminated with a synthetic resin film 7. This serves to prevent penetration of the liquid contents of the cup into the paper sheet 8 during use. Preferably, only the inside surface of the bottom panel member 6 is laminated, when it is not important to prevent evaporation of moisture from paper sheet 8 of the bottom panel member 6 during the foaming operation. In fact it is desirable to allow evaporation of moisture from paper sheet 8 when it is not desired to foam the inside of bottom panel member 6. Just like the synthetic resin film on the outer surface of body member 3, the synthetic resin film on the inside of bottom panel member 6 could foam if sufficient moisture was blocked by a backing layer on the outside of the bottom panel member 6.

A heat-insulating cup according to the invention can be fabricated by means of conventional cup-forming machines, such as the HORAUF MODEL BMP-200 machine, made by Michael Horauf Maschinenfabrik GMBH AND Co KG. First, the outer surface of a paper sheet for the body member can be extrusion-laminated with a film of synthetic resin. The inner surface of the paper sheet is also laminated with a synthetic resin. A paper sheet for making the bottom panel member is also laminated with a synthetic resin, on one side. A blank is cut from each of the paper sheets. Using a conventional HORAUF cup-forming machine, the two blanks are fabricated into a container, with the blank for the bottom panel member oriented in such a way that the film laminated side faces upward. The bottom panel member and body member are joined and heat sealed by applying heat and pressure to form the bottom ridge of the cup. Pressure is applied by an expansion roller on the inner bottom rim of the cup. It is preferred that the expansion roller be adjusted to make two revolutions per cup. If appropriate synthetic resins are chosen, these cups can be fabricated on automated HORAUF machines at speeds of about 165 cups per minute or more, preferably at least about 180 cups per minute, and more preferably about 200 cups per minute or more, for 12 ounce cups.

According to the invention, the printed matter is applied prior to foaming the outside surface laminate of synthetic resin. Thus, for example, the printed matter can be applied to the uncut, but laminated, sheet, or the blanks, prior to fabricating the cup, or after the cup has been fabricated.

A thus-fabricated cup is then subjected to a heat treatment in order to cause moisture in the paper to vaporize, soften the synthetic resin, and foam the outer surface of the body member. The cups can be heat-treated by being conveyed through an oven. The conveyance of the cups through the oven can be performed by laying the cups en masse onto a metal conveyor belt, the cups being in an inverted state, i.e., supported on their rims.

As noted above, it is an object of the invention to provide sufficient insulation or foaming in the printed areas of the outside surface of the cup. That is, a printed cup according to the invention should have the equivalent of at least a printed foam caliper averaging about 85%, and preferably more, of unprinted area foam caliper for a single layer of ink. The foaming in the printed areas can be measured and compared to that of the unfoamed area by a simple test.

Enough printed and unprinted coated paper board material should be obtained to produce about six or more, 1 inch by 8 inch or longer, samples from printed and unprinted areas of a sheet of coated paperboard. The coated paper board material should then be conditioned under constant humidity and temperature at TAPPI (Technical Association of Pulp and Paper Industry) standard conditions (72° F. and 50% RH) for a minimum of 48 hours. Thereafter six (or more) samples from printed and unprinted areas should be cut and formed into a coil with an approximate ½ inch overlap and their ends secured with, e.g., a paper clip. Samples are then placed in a forced air oven preheated to a constant temperature of 130° C. (±1° C.). After one minute samples are removed while being careful not to touch the areas to be measured. From each baked sample there is cut a sample approximately 3/16 inch by 1 inch, which is placed in a microscope sample holder. Preferably these should come from the middle of the 1 inch by 8 inch or longer, samples. Enough 3/16 inch by 1 inch samples should be obtained to produce six printed and six unprinted caliper readings. The samples can then be observed under a microscope to determine their board caliper and total structure caliper to obtain a percentage gain of the total caliper versus the board caliper. Upon completion the average percentage gain of the printed samples versus the average percentage gain of the unprinted samples can be obtained.

It is also important according to the invention that the printed matter be comparable in terms of durability to printed matter obtained using acrylic based inks. Several tests can be used. Preferably inks used according to the invention should, after the foaming process, pass dry rub, wet rub, and chemical resistance tests.

A dry rub test is used to evaluate the dry rub or scuff resistance of the coated and printed paperboard. This is done using a standard rub tester such as the Sutherland rub tester (Testing Machines, Inc., 400 Bayview Avenue, Amityville N.Y.), equipped with 908 gram (2 lb) and 1816 gram (4 lb) weights. For example, specimens can be cut from a sample to be tested. Using a Sutherland rub tester and without touching the printed surface to be tested, one of the specimens with the printed side to be tested upward, is attached to the rubber pad on the base of the instrument using double coated pressure sensitive tape, or just the pins protruding through the rubber pad. Another specimen of the same material is attached to the rubber pad of the tester weight to be used with the unprinted side facing outward, also without touching the test surface. A soft bristle brush is used to remove surface dust and/or particles from the test surface. Then the weight is attached to the tester so that the test surfaces contact each other. The cycle selector is then set for the number of strokes desired depending on the request, specification or past experience, and then the tester is started. 25, 50, 75 and 100 cycles are common. This test can be used with either foamed or unfoamed samples. A sample which passes the rub test will exhibit virtually no smear or ink transfer. Preferably there will be none.

Printed and foamed cups according to the present invention exhibit good ink durability and can pass the aforementioned 25 dry rub test using a four pound weight, and, in some instances, as many as 100 dry rubs or more. On the other hand, printed, but unfoamed cups prepared with inks used according to the invention can fail the aforementioned 25 dry rub test using a four pound weight. Again this is believed to be due to the delayed, thermally induced crosslinking.

Wet rub and chemical resistance are also of importance. Wet rub resistance can also be tested using a standard rub tester such as the Sutherland rub tester. Using the Sutherland rub tester as an example, specimens are mounted in the manner as for the dry rub test, but with a 908 gram weight and cycle set for three rubs. 2 drops of distilled water (or any other desired liquid) are placed on the specimen in the area to be rubbed. The upper block is placed in position and the start button is immediately pressed. Printed and foamed cups according to the present invention can pass the aforementioned 3 wet rub test. On the other hand, printed, but unfoamed cups prepared with inks used according to the invention can fail the aforementioned 3 wet rub test.

The thicknesses (calipers) of the synthetic resin films to be laminated on the body member and bottom panel members of cups according to the invention are not limited to any particular values. However, the thickness of the resin on the outer surface of the body member should be sufficient to provide a desired thickness of heat insulating foam. Suitable thicknesses for such films can be from 25 to 60 $\mu$m. The thickness of the films to be laminated on the inner surfaces of the body member and the bottom panel member need only be sufficient to ensure adequate heat sealing and resistance to liquid permeation during use.

The paper sheets used to prepare cups according to the invention can be those conventionally used to prepare cups of this type. They preferably have basis weights in the range of 100 g/m$^2$ to 400 g/m$^2$. It is also preferable that the paper sheets have a water content of from about 3% to about 10%.

The heating time and temperature for the foaming operation can also be those conventionally used. For example, the temperature can vary from about 240° F. to about 270° F., and the heating time can vary from about 1.5 minutes to about 2.5 minutes.

Any conventional heating means such as hot air, infrared, or microwave can be used. Heating by hot air in a tunnel having transporting means such as a conveyor has the advantage of accomplishing mass production at low cost.

Coating and laminating as used herein have been, and are, used interchangeably. A wide variety of synthetic resins can be used so long as they are chosen to serve their function appropriately. For example, to obtained a foamed outer surface of the cup, the film to be laminated on the outer surface should have a lower softening point than the film to be laminated on the inner surface. Types of suitable synthetic resins include polyethylenes, polypropylenes, polyvinyl chlorides, polystyrenes, polyesters, nylons, etc.

Preferred synthetic resins, however, are the low and high density polyethylenes, and the modified polyethylenes described in U.S. application Ser. No. 08/870,486, filed Jun. 6, 1997, as well as techniques for producing heat insulating cups, using those polyethylenes. In this embodiment, the body member is coated (or in some instances partially coated) on its outside surface with a foamed low density polyethylene, and on its inside surface with an unfoamed modified low density polyethylene. The bottom panel member is coated on its upper surface with an unfoamed low density polyethylene or unfoamed modified low density polyethylene. The body member and bottom panel member are oriented and joined to form a heat seal at an interface between a portion of the unfoamed modified low density polyethylene coated on the inside surface of the body member and a portion of the unfoamed low density polyethylene or unfoamed modified low density polyethylene coated on the upper surface of the bottom panel member. The modified low density polyethylene is a low density polyethylene modified in a manner effective to provide an improved seal between the bottom panel member and the body member of a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

The low density polyethylenes to be used as coatings or laminates include those polyethylenes that have highly branched and widely spaced chains. Such branched chain polyethylenes are typically characterized as having densities of about 0.910 to about 0.925 g/cm³, crystallinities of about 50–60%, and melting points ($T_{peak}$) in the range of about 100° C. to about 110° C. (about 212° F. to about 230° F.).

Low density polyethylenes can be prepared by conventional methods. For example, such polyethylenes can be prepared by polymerization in a free-radical-initiated liquid phase reaction at about 1500 atm (22,000 psi) and about 375° F., with oxygen as a catalyst (usually from peroxides). Vapor phase techniques are also used by polyethylene manufacturers. These use pressures of only about 100 to about 300 psi at less than about 212° F.

A preferred low density polyethylene is PE 4517 sold by Chevron Chemical Company. PE 4517 is a low density polyethylene extrusion coating resin. It has a melt index of 5.0 gms/10 min. (ASTM test method D1238-62T), and a density of 0.923 g/cc (ASTM test method D1505-60T)

Modified low density polyethylenes include the aforementioned low density polyethylenes blended with enough non-low density polyethylene, such as high density polyethylene, to prevent laminates of the modified low density polyethylenes from foaming when fabricated cups are subjected to the foaming operation. For example, enough high density polyethylene must be present such that a laminate of modified low density polyethylene on the inside surface of the body member of a fabricated cup will not foam under conditions of about 240° F. to about 270° F. and a residence time of about 1.5 to about 2.5 minutes, when the cup is subjected to the foaming operation in a forced hot-air oven. On the other hand, enough low density polyethylene must be present in the blend such that an effective seal is obtained between the body member and the bottom panel member. An effective seal is one which provides a satisfactory seal between the bottom panel member and the body member of a cup when fabricated at a speed of at least 165 cups per minute for a 12 ounce cup by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

Examples of suitable blends include those containing approximately 90% low density polyethylene (10% high density polyethylene), and those containing 10% low density polyethylene (90% high density polyethylene). Such blends have been found not to foam under conditions of about 240° F. to about 270° F. and a residence time of about 1.5 to about 2.5 minutes, when the cup is subjected to the foaming operation in a forced hot-air oven, yet can exhibit an improved seal in a 12 ounce cup fabricated at a speed of at least about 165 cups per minute by a HORAUF MODEL BMP-200 machine, made by Michael Horauf Maschinenfabrik GMBH AND Co KG, with temperature controls set at between about 350° to about 460° C. and a bottom expansion pressure set at about 3000 kilopascals for two revolutions per cup.

The blends can also contain as little as about 2% to about 7% high density polyethylene, although about 10% high density polyethylene is preferred.

High density polyethylenes as used herein include those that have comparatively straight or linear chains which are closely aligned. The physical properties are much different from those of low density polyethylenes because of the increased density. Such linear polyethylenes are typically characterized as having densities in the range of about 0.941 to about 0.965 g/cm³, crystallinities typically characterized in the range of about 90%, and melting points ($T_{peak}$) in the range of about 128° C. to about 135° C. (about 236° F. to about 275° F.).

High density polyethylenes can be prepared by conventional methods such as polymerizing ethylene using Ziegler catalysts at from about 1 to about 100 atm (15 to 1500 psi) at from room temperature to about 200° F.

A preferred high density polyethylene is M3020P, formerly "M2004-P", sold by Eastman Chemical Company. M3020P is a high density polyethylene which has a melt index of 9.5 gms/10 min. (ASTM test method D1238), and a density of 0.944 g/cc (ASTM test method D4883). M2004-P is a high density polyethylene which has a melt index of 8.4 gms/10 min. (ASTM test method D1238), and a density of 0.945 g/cc (ASTM test method D4883).

The invention will be described further by way of the following examples. It should be understood that the invention is not limited to the details set forth in the examples.

EXAMPLE 1

(Foam Height/Durability Testing Of Epoxy-, Alkyd- and Epoxy/Alkyd Blend-Based Inks)

Various samples were prepared to determine the foam height obtained using epoxy-based, alkyd-based, and epoxy/alkyd blend-based inks. These are identified below as "E-1", "A-1" and "E/A-1", respectively. E-1 was HydroScuff PTT available from Progressive Ink, and formulations E-1 and E/A-1 were essentially identical except for the substitution of fatty acid alkyd resin for a portion of the epoxy ester resin in E-1. A-1 had essentially the same formulation as E-1 except for the substitution of fatty acid alkyd resin for all of the epoxy ester resin. The formulations for E-1 and E/A-1 are set forth below.

| E-1 | | E/A1 | |
|---|---|---|---|
| % by Weight | Ingredient | % by Weight | Ingredient |
| 45.3 | water | 46.2 | water |
| 2.0 | glycol ether | 2.0 | glycol ether |
| 1.6 | amine | 1.6 | amine |
| 6.7 | additives | 6.7 | additives |
| 20.9 | epoxy ester resin | 7.2 | epoxy ester resin |
| 23.5 | organic pigment | 12.8 | fatty acid alkyd resin |
| | | 23.5 | organic pigment |

Another sample was prepared substituting a chain-stopped alkyd resin for the fatty acid alkyd resin of E/A-1. This sample is given the designation E/A-2. For each ink described above, water was added to correct viscosity to within the normal range of about 20–25 seconds in a #2 Zahn cup.

Two samples of each ink were tested to determine an average foam height in printed areas relative to unprinted areas.

Paperboard coated with foamable low density polyethylene was used. A single layer of printing was applied using two samples of each ink. Enough printed paperboard, also having unprinted areas, was used to produce 12 foam height data points for each sample. In each case after the paperboard was conditioned and then subjected to heat treatment (foaming) for approximately 1 minute at 130° C., twelve cuttings for each sample were observed under a microscope to obtain measurements for board caliper and total structure caliper. This provided values of total caliper in printed areas versus the board caliper in the corresponding printed areas, and total caliper in unprinted areas versus the board caliper in the corresponding unprinted areas. A relative foam caliper (ratio of caliper of printed foam to caliper of unprinted foam) for each cutting was then obtained using the following formula:

Relative Foam Caliper =

$$\frac{(\text{Printed Area Total Caliper} - \text{Board Caliper})/\text{Board Caliper}}{(\text{Unprinted Area Total Caliper} - \text{Board Caliper})/\text{Board Caliper}} \times 100$$

The procedure was repeated for the second sample of each ink. The relative foam caliper values were then averaged. The results for each ink are set forth below in Table 1.

The E-1, A-1, E/A-1 and E/A-2 inks were also tested for rub resistance. When proofs of those inks were foamed they all passed 25 dry rubs with a four pound weight. Unfoamed proofs all failed before 25 rubs with some ink smear and some ink transfer. Thus durable samples were obtained using inks in accordance with the present invention as these results fall within the limits of commercial acceptability. Because the unfoamed samples did not pass the rub test, these results also demonstrate that durability was provided by delayed thermally induced crosslinking rather than earlier catalytically induced crosslinking.

TABLE I

| SAMPLE | RESIN TYPE | VISCOSITY (sec. #2 Zahn cup) | AVERAGE RELATIVE FOAM CALIPER (Printed to Unprinted) | DRY RUB TEST (after foaming) |
| --- | --- | --- | --- | --- |
| E-1 | Epoxy Ester | 23.0 | 98.8 | pass |
| | Water Reducible Fatty Acid Alkyd | 20.0 | 104.9 | pass |
| E/A-1 | Epoxy Ester/Water Reducible Fatty Acid Alkyd | 21.0 | 101.2 | pass |
| E/A-2 | Epoxy Ester/Water Reducible Chain Stopped Alkyd | 21.0 | 99.2 | pass |

EXAMPLE 2

(Comparative Example)

Using the same procedure as described above for Example 1, the foam height for a commercially available acrylic-based ink was determined. That ink was AHT-5000, an acrylic/epoxy ester blend, available from Progressive Ink. Another ink, completely acrylic-based (not a blend) was formulated, and also tested according to the procedure of Example 1, although only one sample of this ink, rather than two, was tested. This completely acrylic-based ink is given the designation AC-1. The results are set forth below in Table 2.

TABLE 2

| SAMPLE | RESIN TYPE | VISCOSITY (sec. #2 Zahn cup) | AVERAGE RELATIVE FOAM CALIPER (Printed to Unprinted) | DRY RUB TEST (after foaming) |
| --- | --- | --- | --- | --- |
| AHT-5000 | Acrylic/Epoxy Ester Blend | 21.0 | 81.2 | pass |
| AC-1 | Acrylic | 22.0 | 80.3 | — |

Although the invention has been described above in terms of preferred embodiments, it is to be understood that variations and modifications may be resorted to as will be apparent to those skilled in the art. Such variations and modifications are to be considered within the purview and scope of the claims appended hereto. For example, the invention was described in detail in terms of a heat insulating cup—the preferred embodiment. However, the invention is applicable to other heat insulating containers with foamed outer surfaces as well.

What is claimed is:

1. A method for fabricating a heat insulating paper container from a paper-based body member with an inside surface and an outside surface, and a paper-based bottom panel member with an upper surface and a bottom surface, said method comprising:
    applying to the inside surface of said body member an inside surface laminate of a synthetic resin effective to prevent penetration of liquid into the paper during use, and applying to said outside surface an outside surface laminate of foamable synthetic resin;
    printing at least a portion of the outside surface of said body member having applied thereto an outside surface laminate, with a water-based alkyd or epoxy ink, or with a water-based ink which contains both an epoxy and an alkyd; and
    fabricating said container so that said body member is bonded to said bottom panel member, and said outside surface laminate of synthetic resin is foamed;
    wherein the water-based ink is selected in an amount which provides a printed foam caliper averaging at least about 85% of unprinted area foam caliper for a single layer of ink.

2. A method according to claim 1, wherein the body member is bonded to said bottom panel member before foaming of the outside surface laminate of synthetic resin.

3. A method according to claim 1, wherein the body member is bonded to said bottom panel member after foaming of the outside surface laminate of synthetic resin.

4. A method according to claim 1, wherein at least a portion of the outside surface of said body member having applied thereto an outside surface laminate, is printed with the water-based ink using flexographic or rotogravure printing.

5. A method according to claim 1, comprising printing at least a portion of the outside surface of said body member having applied thereto an outside surface laminate, with a water-based epoxy ink.

6. A method according to claim 5, wherein the epoxy ink is formulated using an epoxy ester.

7. A method according to claim 1, comprising printing at least a portion of the outside surface of said body member having applied thereto an outside surface laminate, with a water-based alkyd ink.

8. A method according to claim 7, wherein the alkyd ink is formulated using an fatty acid alkyd.

9. A method according to claim 7, wherein the alkyd ink is formulated using an chain stopped alkyd.

10. A method according to claim 1, wherein the water-based ink is selected from those effective to provide a printed foam caliper averaging at least about 90% of unprinted area foam caliper for a single layer of ink.

11. A method according to claim 10, wherein the water-based ink is selected from those effective to provide a printed foam caliper averaging at least about 95% of unprinted area foam caliper for a single layer of ink.

12. A method according to claim 10, wherein the water-based ink is selected from those which, when applied, will provide printing that will pass a 25 dry rub test using a four pound weight after the outside surface laminate has been foamed.

13. A method according to claim 12, wherein the water-based ink is selected from those which, when applied, will provide printing that will pass a 100 dry rub test using a four pound weight after the outside surface laminate has been foamed.

14. A method according to claim 12, wherein the water-based ink is selected from those which, when applied, will provide printing that will not pass a 25 dry rub test using a four pound weight before the outside surface laminate has been foamed.

15. A method according to claim 14, comprising thermally crosslinking the applied water-based ink when the outside surface laminate is foamed.

* * * * *